US010922257B2

(12) United States Patent
Jerolm et al.

(10) Patent No.: US 10,922,257 B2
(45) Date of Patent: Feb. 16, 2021

(54) COUPLER FOR AN AUTOMATION SYSTEM (71) Applicant: WAGO Verwaltungsgesellschaft mbH, Minden (DE)

(72) Inventors: Daniel Jerolm, Bad Essen (DE); Hans-Herbert Kirste, Minden (DE); Frank Quakernack, Bielefeld (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 0 days.

(21) Appl. No.: 15/933,835

(22) Filed: Mar. 23, 2018

(65) Prior Publication Data
US 2018/0276166 A1    Sep. 27, 2018

(30) Foreign Application Priority Data
Mar. 23, 2017  (DE) .............. 10 2017 002 804.4

(51) Int. Cl.
| | |
|---|---|
| *G06F 13/40* | (2006.01) |
| *G06F 13/10* | (2006.01) |
| *G06F 13/20* | (2006.01) |
| *H04L 12/46* | (2006.01) |

(52) U.S. Cl.
CPC ........ *G06F 13/4027* (2013.01); *G06F 13/102* (2013.01); *G06F 13/20* (2013.01); *G06F 13/4068* (2013.01); *Y02P 90/02* (2015.11)

(58) Field of Classification Search
CPC .... G06F 13/4027; G06F 13/102; G06F 13/20; G06F 13/4068; H04L 12/46
USPC .......... 710/11, 30, 62, 65, 68, 300, 105, 306
See application file for complete search history.

(56) References Cited

U.S. PATENT DOCUMENTS

| | | | | |
|---|---|---|---|---|
| 7,289,538 B1* | 10/2007 | Paradise | ............... | H04J 3/0632 370/497 |
| 7,760,733 B1* | 7/2010 | Eiriksson | ............... | H04L 69/324 370/392 |
| 7,852,857 B2 | 12/2010 | Beckhoff et al. | | |
| 8,260,736 B1* | 9/2012 | Lear | ......................... | G06N 5/02 706/46 |
| 9,667,539 B2* | 5/2017 | Balus | ...................... | H04L 47/31 |

(Continued)

FOREIGN PATENT DOCUMENTS

| | | |
|---|---|---|
| EP | 1 590 927 B1 | 11/2005 |
| EP | 2 227 4655 B1 | 8/2015 |

*Primary Examiner* — Farley Abad
*Assistant Examiner* — Henry W Yu
(74) *Attorney, Agent, or Firm* — Muncy, Geissler, Olds & Lowe, P.C.

(57) ABSTRACT

A coupler for an automation system for controlling a process having a network interface for connection to an Ethernet-based network for receiving an Ethernet telegram having process data of the process and having control data. A local bus interface connects to a local bus for transmitting a local bus telegram. A circuit is formed between the network interface and the local bus interface. The circuit includes an arithmetic circuit for retrieving the process data from a payload data area of the Ethernet telegram. The circuit includes a first data filter circuit, which differs from the arithmetic circuit, for filtering out a predetermined subset of the control data from a header of the Ethernet telegram preceding the payload data area. The circuit is configured to generate the local bus telegram and to insert the process data and the predetermined subset of the control data into the local bus telegram.

18 Claims, 5 Drawing Sheets

(56) References Cited

U.S. PATENT DOCUMENTS

| | | | |
|---|---|---|---|
| 2006/0165121 A1* | 7/2006 | MacDonald | H04L 41/0806 370/466 |
| 2007/0064727 A1* | 3/2007 | Lockridge | H04N 21/23614 370/466 |
| 2007/0223490 A1* | 9/2007 | Mizutani | H04Q 11/0067 370/395.6 |
| 2008/0130490 A1* | 6/2008 | Yu | H04L 12/4633 370/223 |
| 2009/0034522 A1* | 2/2009 | Hayes | H04L 12/4633 370/389 |
| 2009/0323727 A1* | 12/2009 | Surek | H04J 3/1658 370/503 |
| 2010/0211711 A1 | 8/2010 | Kuschke et al. | |
| 2013/0100805 A1* | 4/2013 | Heine | H04L 47/10 370/230 |
| 2014/0119377 A1* | 5/2014 | Crosta | H04L 45/7453 370/392 |
| 2014/0369179 A1* | 12/2014 | Ueda | H04L 67/12 370/217 |
| 2015/0009799 A1* | 1/2015 | Sawada | H04L 12/437 370/216 |
| 2015/0365252 A1* | 12/2015 | Bunte | H04L 12/6418 709/208 |

* cited by examiner

COUPLER FOR AN AUTOMATION SYSTEM

This nonprovisional application claims priority under 35 U.S.C. § 119(a) to German Patent Application No. 10 2017 002 804.4, which was filed in Germany on Mar. 23, 2017, and which is herein incorporated by reference.

BACKGROUND OF THE INVENTION

Field of the Invention

The present invention relates to a coupler for an automation system.

Description of the Background Art

A field bus is a bus system that connects field devices in a system, such as sensors and actuators, for the purpose of communicating with an automation device. Standardized protocols exist for communication. A large number of different field bus systems having different properties are established on the market. Field buses have been standardized in the standard IEC 61158 (Digital data communication for measurement and control—Field bus for use in industrial control systems) since 1999. The latest generation of field bus technology is based on real-time Ethernet. Known field buses are, for example, Ethernet-/IP, PROFIBUS, PROFINET or EtherCAT.

A physical layer (PHY) is a circuit in computer and information technology, which is responsible for encoding and decoding data between a purely digital circuit and a modulated analog system, for example transmission via the twisted-pair cable. A physical layer is implemented, for example, in a field bus user and is used for communication via the field bus. The physical layer is used for digital access to the channel operated in a modulated manner (cable).

A coupler for a network having a ring topology and a network (field bus), which is based on Ethernet, is known from EP 1 590 927 B1, which corresponds to U.S. Pat. No. 7,852,857. If the transmission physics of the Ethernet network differs from that of the annular transmission path, a processing unit is necessary in the coupler to convert an Ethernet telegram from the transmission physics of the Ethernet network to that of the annular transmission path.

This processing unit is disposed between the external interface and the internal interface of the coupler. Necessary changes to the Ethernet telegram may furthermore be carried out by the processing unit to guarantee the Ethernet standard for modified Ethernet telegrams output on the transmission path, e.g. by exchanging source and destination addresses and recalculating an Ethernet checksum.

A method and a bus coupler are provided in EP 2 274 655 B1, which corresponds to US 2010/0211711, for exchanging data between a higher level network and a lower-level network. The bus coupler includes an external interface for connection to an external network (higher-level bus system), on which network-specific telegrams are transmittable. The bus coupler includes an internal interface for connecting a plurality of bus users in series to an annular transmission path of a lower-level bus system. The bus coupler includes a conversion unit, which is designed in such a way that it is able to convert a network-specific telegram received via the external interface into an internal data telegram for transmission via the annular transmission path. The data telegram contains no control data of the network-specific telegram. The conversion unit removes the Ethernet header containing control data from each Ethernet telegram received and writes only the payload data transmitted in the data field to a data field of the internal data telegram. The Ethernet telegrams are converted into internal data telegrams of equal length. The data telegrams are transferred to the lower-level bus system via the transmitting unit of the bus coupler and transmitted back again to the receiving unit of the coupler via the bus users.

SUMMARY OF THE INVENTION

It is therefore an object of the present invention to provide a coupler which is preferably flexible.

Accordingly, in an exemplary embodiment, a coupler is provided for an automation system. The automation system is used to control a process. The automation system includes, for example, a control center having a PLC (Programmable Logic Controller). The PLC can be connected by an Ethernet-based network (field bus) to a large number of devices for controlling the process. However, other automation system may also be provided. For this purpose, the coupler connects an Ethernet-based network to a local bus.

The coupler includes a network interface for connection to an Ethernet-based network for receiving an Ethernet telegram having process data of the process and having control data. A network interface can be understood in the sense of at least one network interface, so that the coupler may include precisely one or multiple network interfaces. The coupler can also be configured to transmit process data of the process to other devices—connected to the Ethernet-based network—via the network interface. According to an embodiment of the invention, the network interface includes a connecting mechanism (jack).

The coupler includes a local bus interface for connection to a local bus for transmitting a local bus telegram. A local bus interface can be understood in the sense of at least one local bus interface, so that the coupler may include precisely one or multiple local bus interfaces. The coupler can be configured to transmit process data of the process to at least one local bus user connected to the local bus via the local bus interface and/or to receive process data at least one local bus user. The type of network interface and the type of local bus interface can differ from each other. Due to the different transmission physics of the Ethernet-based network and the local bus in this case, the coupler is preferably configured to convert the Ethernet telegram from the transmission physics of the Ethernet-based network into the transmission physics of the local bus. According to an embodiment of the invention, the local bus interface includes a connecting mechanism, e.g. in the form of metallic contacts. The coupler can also have other electrical and/or mechanical functions.

The coupler includes a circuit formed between the network interface and the local bus interface. A circuit can be understood in the sense of at least one circuit, so that the coupler may include precisely one or multiple circuits. The circuit can be connected as a digital electronic circuit to the network interface and to the local bus interface. The circuit is designed to carry out functions of the coupler. For example, the circuit can be formed on a circuit carrier and can be integrated into one or multiple semiconductor chips. This does not exclude the network interface and/or the local bus interface from having an interface-specific interface circuit.

The circuit includes an arithmetic circuit for retrieving process data from a payload data area of the Ethernet telegram. The payload data area is also referred to as the payload. An arithmetic circuit can be understood in the sense of at least one arithmetic circuit, so that the coupler may include precisely one or multiple arithmetic circuits. The received process data is preferably assigned to one or multiple local bus users. Correspondingly, the received process data can be forwarded to local bus users via the local bus.

The circuit includes a first data filter circuit, which differs from the arithmetic circuit, for filtering out a predetermined subset of the control data from a header of the Ethernet telegram preceding the payload data area. A first filter circuit can be understood in the sense of at least one first data filter circuit, so that the coupler may include precisely one or multiple first data filter circuits. The subset of the control data is predetermined precisely when a rule limiting the subset is stored in the circuit. For example, the subset may be predetermined by limits of the subset which is defined, in particular stored, in the circuit. Control data can be understood to be data in the header/footer of the Ethernet telegram which is assigned to control functions, such as the destination MAC, source MAC or EtherType. The first data filter circuit differs from the arithmetic circuit if both circuits are able to carry out at least the functions of retrieving and filtering in parallel. The arithmetic circuit and the first data filter circuit can be designed in such a way that the retrieval of the process data and the filtering out of the subset of the control data take place independently of each other. The filtering out of the subset of the control data takes place, for example, by separating the subset of the control data from the remaining control data. The circuit can be configured to temporarily store the subset of the control data separated from the remaining control data.

The circuit can be configured to generate the local bus telegram and to insert the process data and the predetermined subset of the control data into the local bus telegram. A protocol of the local bus and a protocol of the Ethernet telegram are preferably different. The local bus telegram is preferably shorter than the Ethernet telegram. The local bus telegram preferably has a header and a payload data area. In an embodiment, the process data and the predetermined subset of the control data are inserted into the payload data area of the local bus telegram. In an embodiment, the process data is inserted into the payload data area of the local bus telegram, and the predetermined subset of the control data is inserted into the header of the local bus telegram.

The first data filter circuit can be configured to set the predetermined subset of the control data. The ability to set the subset makes it possible to select the data in the header which is to be filtered out. By setting the subset of the control data, it is possible, for example, to choose between a destination MAC or a source MAC or an EtherType as the subset of the control data.

The first data filter circuit can be configured to set the predetermined subset of the control data. The circuit can be configured to set a predetermined subset of the control data via the input of the first data filter circuit. The input for setting the predetermined subset of the control data is, for example, a register to which the limits of the subset may be written.

The circuit can include a second data filter circuit for filtering the predetermined subset of the control data in addition to the first data filter circuit. A second data filter circuit can be understood in the sense of at least one second data filter circuit, so that the coupler may include precisely one or multiple second data filter circuits. The second data filter circuit preferably differs from the first data filter circuit, so that the two circuits are able to separately carry out at least the function of filtering out.

The network interface can include one first physical layer having a transmission link (TX) and a receiving link (RX) and a second physical layer having a transmission link (TX) and a receiving link (RX). Correspondingly, the first data filter circuit and the second data filter circuit may be connected differently.

The network interface can include a first physical layer. The first data filter circuit and the second data filter circuit are connected to the same first physical layer of the circuit. In particular, the first data filter circuit is connected to a receiving link (RX) of the first physical layer, and the second data filter circuit is connected to a transmitting link (TX) of the first physical layer.

The first data filter circuit and the second data filter circuit can be connected to different physical interfaces of the network interface. In particular, the first data filter circuit is connected to a receiving link (RX) of the first physical layer, and the second data filter circuit is connected to a receiving link (RX) of the second physical layer.

A data input of the data filter circuit can be connected to an output of a physical layer. According to an embodiment, a data input of the data filter circuit can be connected to an input of a physical layer. Both incoming and outgoing Ethernet telegrams may be filtered hereby. According to an embodiment, two first data filter circuits can be connected to a first physical layer (RX/TX), and two second data filter circuits are connected to a second physical layer (RX/TX) of the circuit. Due to these four data filter circuits, all incoming and outgoing Ethernet telegrams may be filtered in the case of two RJ45 connectors.

The first data filter circuit can include a counter. The first data filter circuit can be configured to count data units of the Ethernet telegram by incrementing or decrementing a counter value. The data units of the Ethernet telegram are, for example, bits, nibbles or bytes. The first data filter circuit can be configured to filter the predetermined subset of the control data based on the counter value. For example, the counter value is compared with at least one fixed or settable comparison value. The filtering is then carried out based on a comparison result.

The data filter circuit can be configured to filter out an identifier for one type of the received Ethernet telegram. The type of the Ethernet telegram is also referred to as the EtherType and correspondingly forms the subset of the control data.

The circuit can be configured to process the predetermined subset of the control data before it is inserted. Due to the processing, the data to be inserted remains control data of the subset. For example, its format is adapted for the local bus. The circuit is preferably configured to compress the predetermined subset of the control data before it is inserted. Foe example, four different EtherTypes are received, so that this subset of the control data may be compressed to two bits without losing information. The processing, in particular the compression, may take place, for example, with the aid of an LUT table (LUT—Look Up Table). The circuit is preferably configured to insert the processed, predetermined subset of the control data into the local bus telegram. For example, two bits for four different EtherTypes are inserted into the local bus telegram.

The local bus telegram can have a control data area, in particular a header, and a process data area, in particular a payload. The process data is inserted int the process data area of the local bus telegram. The process data area may also be referred to as referred to the payload data area. In an embodiment, the circuit is configured to also insert the subset of the control data into the process data area of the local bus telegram. In an embodiment, the circuit can be configured to insert the subset of the control data into the control data area of the local bus telegram.

The circuit can have a parallel bus which is one M bit wide. For example, the parallel bus has a width of 32 bits. The first data filter circuit and the arithmetic circuit are preferably connected to the parallel bus. The circuit can be configured to copy the received process data and the subset of the control data to an intermediate memory with the aid of the parallel bus for the purpose of generating the local bus telegram. According to an embodiment, the circuit includes a DMA controller (DMA—Direct Memory Access) for controlling the copying of the process data and the subset of the control data. The DMA controller can also be referred to as the direct memory access controller.

In an embodiment, an automation system is provided for controlling a process, which includes at least one coupler.

Another subject of the invention is a method for operating a coupler for an automation system, including the steps: receiving an Ethernet telegram, including process data of the process and including control data, via a network interface designed for connection to an Ethernet-based network; transmitting a local bus telegram via a local bus interface designed for connection to a local bus; retrieving process data from a payload data area of the Ethernet telegram using an arithmetic circuit of a circuit of the coupler; filtering out a predetermined subset of the control data from a header of the Ethernet telegram using a first data filter circuit of the circuit of the coupler, which differs from the arithmetic circuit; and/or generating a local bus telegram using the circuit of the coupler, the process data and the predetermined subset of the control data being inserted together into the local bus telegram.

The steps of the method can take place in a predetermined order. The local bus telegram can be generated after retrieving the process data and filtering the predetermined subset. The process data received with the Ethernet telegram can be retrieved using the arithmetic unit, and the subset of the control data can substantially simultaneously be filtered out using the first data filter circuit. Steps in addition to the ones specified above may also be provided in the method.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
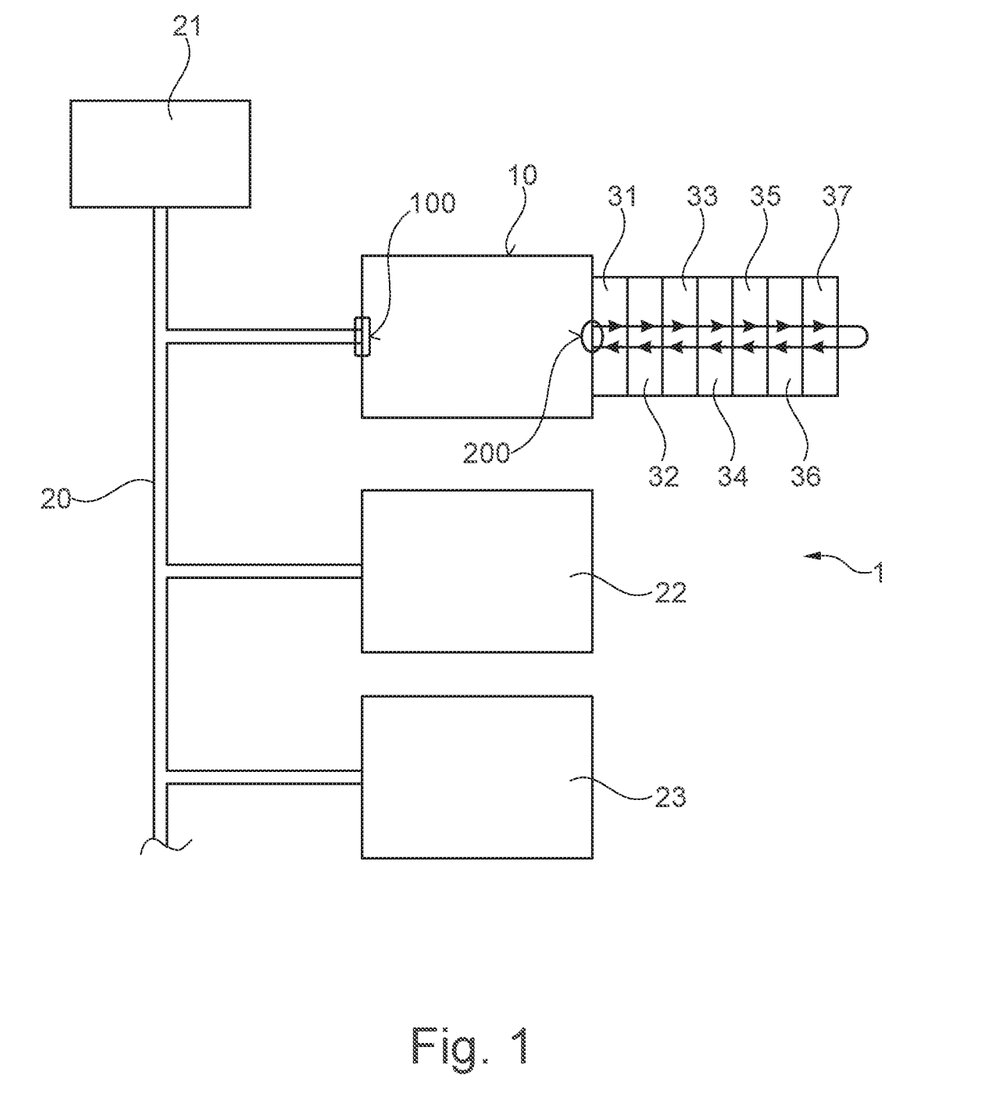
FIG. 1 shows a schematic block diagram of an exemplary embodiment of an automation system, including a coupler.

FIG. 1 shows a schematic block diagram of an automation system 1. Automation system 1 includes an Ethernet-based network 20, as a field bus, to which a coupler 10 is connected. Ethernet-based network 20 may be designed, for example, as an EtherCAT field bus or a PROFInet field bus. A twisted-pair cable having RJ45 plugs/jacks may be used as the physical transmission medium. For the purpose of reduced cabling complexity, devices 21, 10, 22, 23 connected to Ethernet-based network 20 are preferably connected in series. However, Ethernet-based network 20 may also have any other suitable topology. Ethernet-based network 20 is designed to transmit Ethernet telegrams for communication among users 10, 21, 22, 23. In the exemplary embodiment in FIG. 1, a PLC 21 is connected to Ethernet-based network 20, PLC 21 communicating with nodes 10, 22, 23 in automation system 1 via Ethernet-based network 20. PLC 21 may be designed, for example, as a control center.

A coupler 10 is illustrated in the exemplary embodiment in FIG. 1, which is connected to Ethernet-based network 20 and to a local bus 30. A local bus 30 can be a bus which is separate from Ethernet-based network 20. In the exemplary embodiment in FIG. 1, local bus 30 has a transmission mode which differs from Ethernet-based network 20. For example, the protocols used on Ethernet-based network 20 and local bus 30 are different. Likewise, the transmission physics of Ethernet-based network 20 and that of local bus 30 may be different. In the exemplary embodiment in FIG. 1, devices 21, 22, 23 communicate with local bus users 31, 32, 33, 34, 35, 36, 37 exclusively via coupler 10. Coupler 10 may also be referred to as a bus coupler. Local bus users 31, 32, 33, 34, 35, 36, 37 may be disposed at a remote location from each other and from coupler 10. However, local bus users 31, 32, 33, 34, 35, 36, 37 can be disposed in the direct vicinity of coupler 10. Local bus users 31, 32, 33, 34, 35, 36, 37 preferably have a mechanical attachment for fixing to each other and, in particular, to coupler 10. A compact unit may thus be created.

In the exemplary embodiment in FIG. 1, local bus users 31, 32, 33, 34, 35, 36, 37 have a small amount of data, so that only a few items of data are written or read. A shared Ethernet telegram, which supplies local bus users 31, 32, 33, 34, 35, 36, 37 with process data, is therefore used for the data of the local bus users. Coupler 10 includes a network interface 100 for connection to Ethernet-based network 20. An Ethernet telegram containing process data of the process may be received via network interface 100. Coupler 10 furthermore includes a local bus interface 200 for connection to local bus 30. A local bus telegram is transmittable via local bus interface 200. Coupler 10 acts as a link between Ethernet-based network 20 and local bus 30. In the exemplary embodiment in FIG. 1, coupler 10 is configured in the local bus system as the master, and other local bus users 31, 32, 33, 34, 35, 36, 37 are designed as slaves.

In the representation of the exemplary embodiment in FIG. 1, Ethernet-based network 20 may also be referred to as the superordinate bus or higher-level bus, and local bus 30 may be referred to as the subordinate or lower-level bus. Local bus 30 can be designed as a ring bus structure, a local bus telegram passing through local bus users 31, 32, 33, 34,

35, 36, 37 sequentially in the downstream direction and/or in the upstream direction and subsequently returning to coupler 10. Network interface 100 of coupler 10 has contacts in the exemplary embodiment in FIG. 1, for example a jack, for connection to Ethernet-based network 20. Network interface 100 may also include an interface circuit (e.g. transceiver TRX—not illustrated) for communication purposes. Local bus interface 200 of coupler 10 includes contacts for connection to local bus 30. In the exemplary embodiment in FIG. 1, local bus interface 200 also includes an interface circuit for transmitting and for receiving local bus telegrams via local bus 30. In the exemplary embodiment in FIG. 1, Ethernet telegrams may be transmitted via Ethernet network 20, field bus packets having different protocols, for example for ProfiNET or EtherCAT, may be contained in different payloads of multiple Ethernet telegrams. In the exemplary embodiment in FIG. 1, coupler 10 is configured to transmit process data for different field bus protocols on local bus 30.

Figure 2:
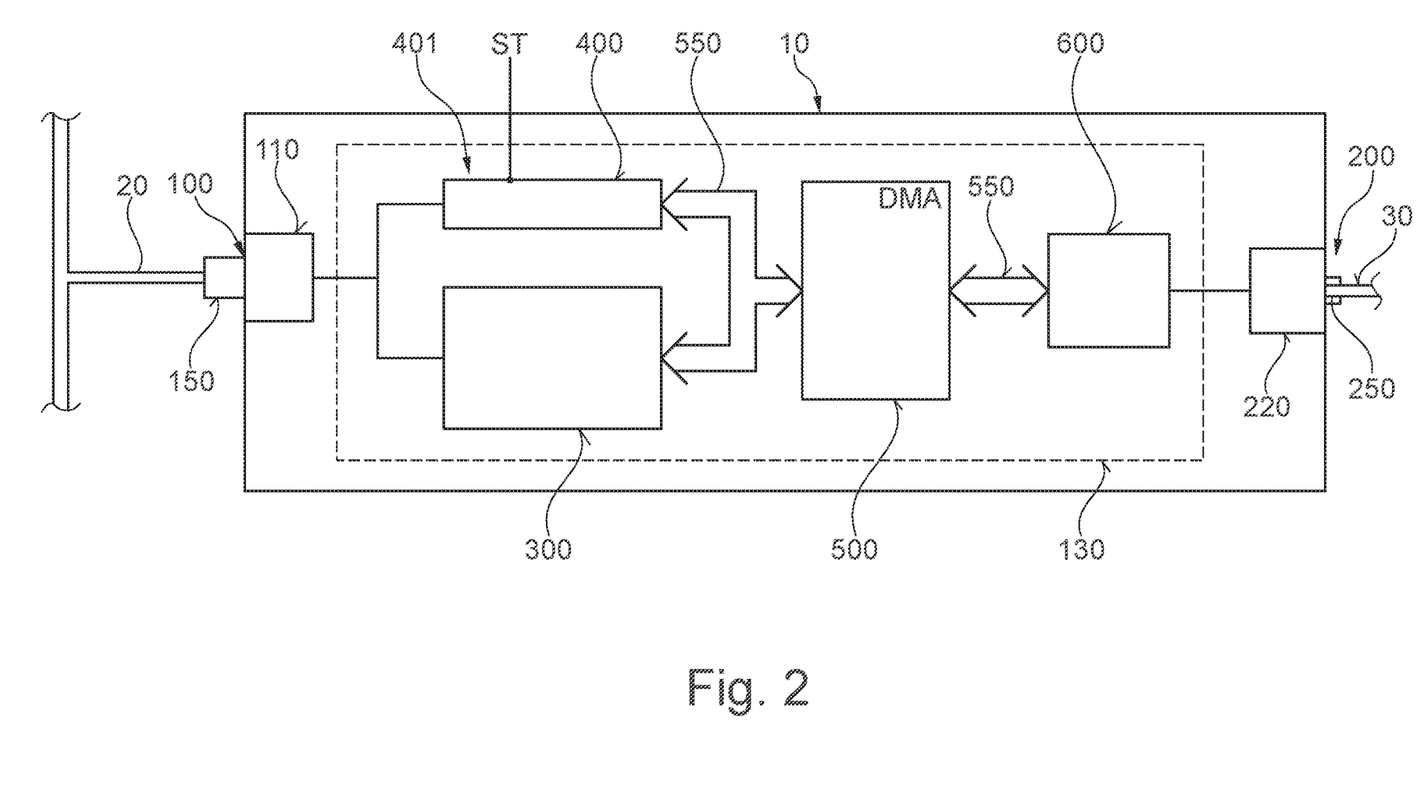
FIG. 2 shows a schematic block diagram of an exemplary embodiment of a coupler.

In the exemplary embodiment in FIG. 2, a coupler 10 is schematically illustrated as a block diagram. Coupler 10 includes a network interface 100 for connection to an Ethernet-based network 20. Network interface 100 in the exemplary embodiment in FIG. 2 includes a jack, to which Ethernet-based network 20 is connected. Network interface 100 is configured to receive an Ethernet telegram, the Ethernet telegram including process data of a process and control data. Network interface 100 includes an interface circuit 110 for receiving the Ethernet telegram. Interface circuit 110 may also be referred to as physical layer PHY.

Coupler 10 also includes a local bus interface 200 for connection to a local bus 30. Local bus interface 200 in the exemplary embodiment in FIG. 2 includes electrical contacts 250, to which local bus 30 is connected. Local bus interface 200 is configured to transmit a local bus telegram, the local bus telegram including process data for multiple local bus users. Local bus interface 200 includes an interface circuit 220 for transmitting the local bus telegram.

Coupler 10 includes a circuit 130, which is formed between network interface 100 and local bus interface 200. Circuit 130 is formed, for example, on a circuit carrier and may have a number of integrated circuits. Circuit 130 includes a first arithmetic circuit 300 for retrieving the process data from a payload data area of the Ethernet telegram. First arithmetic circuit 300 is connected to network interface 100 for reading in the Ethernet telegram. First arithmetic circuit 300 can be configured to temporarily store the process data. First arithmetic circuit 300 is implemented, for example, as hardware logic in an FPGA. A second arithmetic circuit may also be provided—but it is not illustrated in FIG. 2. The second arithmetic circuit is configured, for example, to retrieve data from an Ethernet telegram having another field bus protocol. Alternatively, the second arithmetic circuit is configured, for example, to write data to an Ethernet telegram.

In the exemplary embodiment in FIG. 2, circuit 130 includes a first data filter circuit 400 for filtering out a predetermined subset of the control data from a header of the Ethernet telegram preceding the payload data area. First data filter circuit 400 is also connected to network interface 100 for reading in the Ethernet telegram. First data filter circuit 400 can be configured to temporarily store the predetermined subset of the control data. First data filter circuit 400 is different from first arithmetic circuit 300. As a result, first arithmetic circuit 300 and first data filter circuit 400 are separate from each other but may be formed separately on the same circuit carrier or within one and the same integrated circuit. First arithmetic circuit 300 and first data filter circuit 400 are therefore represented as two separate blocks in FIG. 2. Due to the separation of first arithmetic circuit 300 and first data filter circuit 400, it is possible to carry out the retrieval of the process data from the payload data area of the Ethernet telegram simultaneously and independently of the filtering out of the predetermined subset of the control data from the header of the Ethernet telegram. It is also possible to filter out the predetermined subset of the control data if no process data is retrieved.

In the exemplary embodiment in FIG. 2, circuit 130 is configured to generate local bus telegram 3. For this purpose, circuit 130 in the exemplary embodiment in FIG. 2 has a local bus CPU 600, which is configured to generate the local bus telegram. Local bus CPU 600 of circuit 130 is also configured to insert the process data and the predetermined subset of the control data into the local bus telegram.

In the exemplary embodiment in FIG. 2, first arithmetic circuit 300 and first data filter circuit 400 are connected to a parallel bus 550. Local bus CPU 600 is also connected to parallel bus 550. The exemplary embodiment in FIG. 2 permits a particularly easy implementation. In the exemplary embodiment in FIG. 2, the predetermined subset of the control data may thus be combined with the process data via the parallel bus, using a DMA controller 500, so that the DMA controller is able to easily control the combination of the control data and process data. It is possible to integrate circuit 130 of coupler 10 on a semiconductor chip. For example, circuit 130 may be formed in an FPGA or ASIC.

Due to the separate design of first arithmetic unit 300 and data filter circuit 400, a number of significant advantages are achieved. For example, control data which do not contain process data for local bus users 31, 32, 33, 34, 35, 36, 37 may also be read from an Ethernet telegram. In addition, the processing of the data of an Ethernet telegram may also be made more flexible without sacrificing real-time functionality. Due to the separate filtering out of only a predetermined subset of the control data from the Ethernet telegram, a large number of new functions may be added during operation, which were not previously provided or require more complex resources of circuit 130 of coupler 10. An additional latency is thus avoided. Due to the filtering out of a predetermined subset of the control data, it is also not necessary to transmit the entire Ethernet telegram via local bus 30, so that the available bandwidth is better utilized.

In the exemplary embodiment in FIG. 2, first data filter circuit 400 is configured to set the predetermined subset of the control data. For this purpose, first data filter circuit 400 has an input 401 for setting the predetermined subset of the control data as a function of a control signal ST. Control signal ST may be generated by an external circuit or by circuit 130 of coupler 10. Control signal ST is used to set the predetermined subset of the control data via input 401 of first data filter circuit 300. For example, the limits of the subset are predetermined by register entries, which are written to the register—not illustrated in FIG. 2—by control signal ST.

The operation of coupler 10 illustrated in FIG. 2 takes place in a method sequence. In a first step, an Ethernet telegram containing process data of the process and containing control data is received via network interface 100. In a second step, the process data is subsequently retrieved from a payload data area of the Ethernet telegram by the first arithmetic circuit. The predetermined subset of the control data is preferably simultaneously filtered out of a header of the Ethernet telegram by first data filter circuit 400. In additional steps, the local bus telegram is generated by circuit 130, the process data and the predetermined subset of the control data is inserted into the local bus telegram, and the local bus telegram is transmitted to local bus users 31, 32, 33, 34, 35, 36, 37 via local bus 30. In the opposite direction, a local bus telegram is received by coupler 10. Circuit 130 of coupler 10 is configured to generate an Ethernet telegram and to insert the process data removed from the local bus telegram into the Ethernet telegram.

Figure 3:
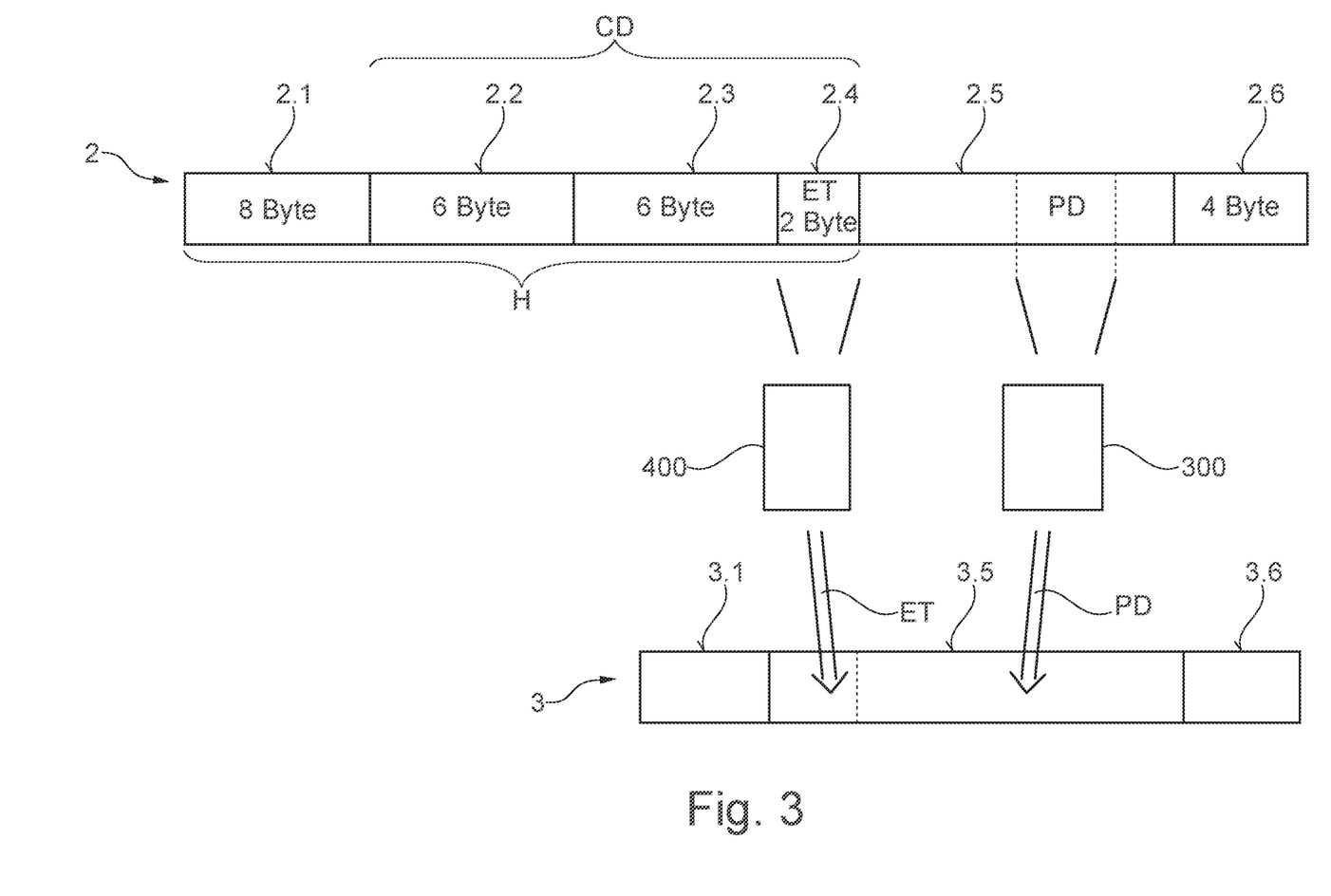
FIG. 3 shows a schematic diagram of an exemplary embodiment, including an Ethernet telegram and a local bus telegram.

A schematic diagram, which schematically shows an Ethernet telegram 2 and a local bus telegram 3, is illustrated in FIG. 3. Ethernet telegram 2 in the exemplary embodiment in FIG. 3 has a header H, a payload data area 2.5 containing process data PD, and a trailer 2.6. Trailer 2.6 may contain, for example, checksums (CRC). Process data PD received is individual items of data for a plurality of local bus users 31, 32, 33, 34, 35, 36, 37 (illustrated in the exemplary embodiment in FIG. 1, and elsewhere). Header H of Ethernet telegram 2 includes control data CD and, for example, a field 2.1 for a preamble. In the present exemplary embodiment in FIG. 3, the preamble is 8 bytes long, including the SFD. In the exemplary embodiment in FIG. 3, multiple fields 2.2, 2.3, 2.4 are provided in Ethernet telegram 2 for control data CD. For example a 6-byte destination MAC is provided as the control data in first field 2.2. For example a 6-byte source MAC is provided as the control data in second field 2.3. For example, a 2-byte type of the Ethernet telegram—EtherType—is provided in third field 2.4.

Process data PD determined for local bus users 31, 32, 33, 34, 35, 36, 37 is removed from Ethernet telegram 2 by a first arithmetic circuit 300. Removed process data PD is then inserted, modified or unmodified, into local bus telegram 3. A first data filter circuit 400 is configured to filter out a predetermined subset ET of control data CD from header H of Ethernet telegram 2 preceding payload data area 2.5. In the exemplary embodiment in FIG. 3, predetermined subset ET corresponds to field 2.4, i.e. the type (EtherType) of Ethernet telegram 2.

Alternatively to the representation in the exemplary embodiment in FIG. 3, another subset may also be predetermined (not illustrated), so that the source MC in field 2.3 is filtered out as another subset. In the exemplary embodiment in FIG. 3, subset ET is predetermined when subset ET is defined, in particular by filter limits, for incoming Ethernet telegrams. Alternatively to the exemplary embodiment in FIG. 3, first data filter circuit 400 is configured to set predetermined subset ET. The user or configurator can hereby set subset ET between different fields 2.2, 2.3, 2.4 of the control data—for example, by changing the limits of the filter.

A local bus telegram 3 is also schematically illustrated in FIG. 3. Local bus telegram 3 has a header 3.1 and a payload data area 3.5 and a trailer 3.6. Trailer 3.6 may contain, for example, checksums (CRC). Process data PD is inserted into payload data area 3.5 of local bus telegram 3. Each local bus user 31, 32, 33, 34, 35, 36, 37 is configured to remove individual items of (process) data assigned to it from local bus telegram 3 (summation frame protocol). In the exemplary embodiment in FIG. 3, subset ET of control data CD is also inserted into payload data area 3.5 of local bus telegram 3. In the exemplary embodiment in FIG. 3, subset ET of control data CD precedes process data PD in payload data area 3.5. Those skilled in the art are aware that much more complex local bus telegrams 3 may also be provided. Alternatively to the exemplary embodiment in FIG. 3, subset ET of control data CD is inserted into another part of local bus telegram 3, for example after process data PD in header 3.1 of local bus telegram 3 or in payload data area 3.5.

Figure 4:
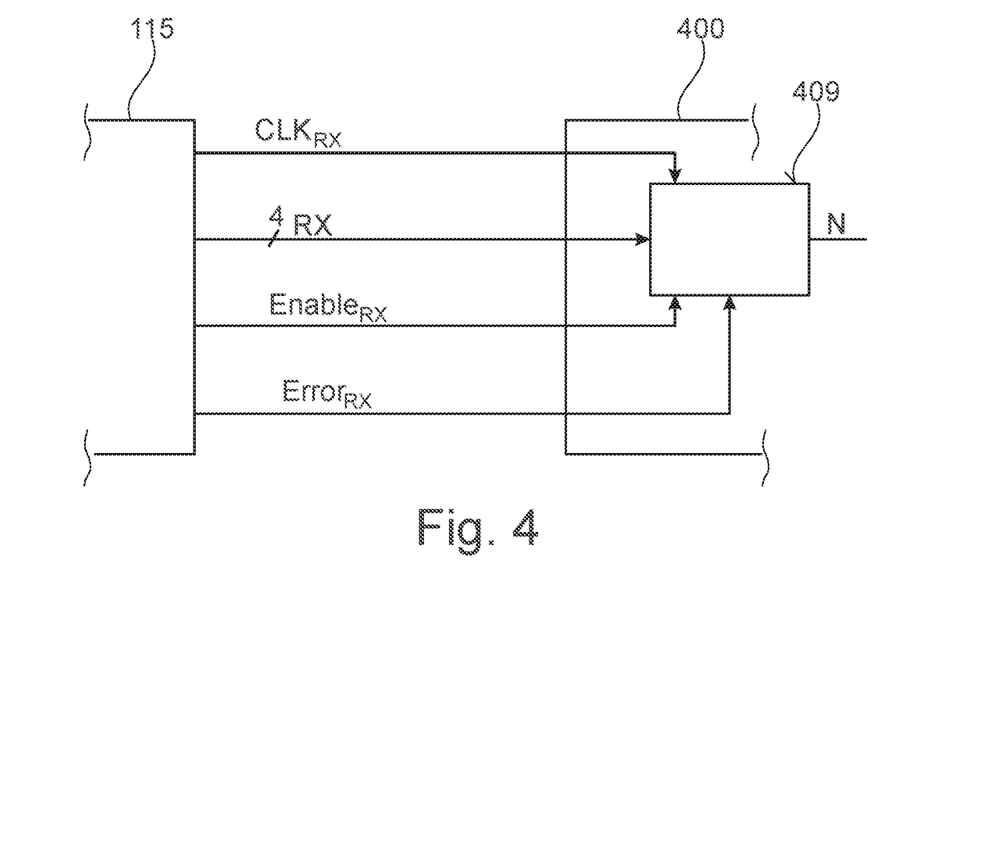
FIG. 4 shows a detail of a schematic block diagram of an exemplary embodiment of a coupler.
Figure 5:
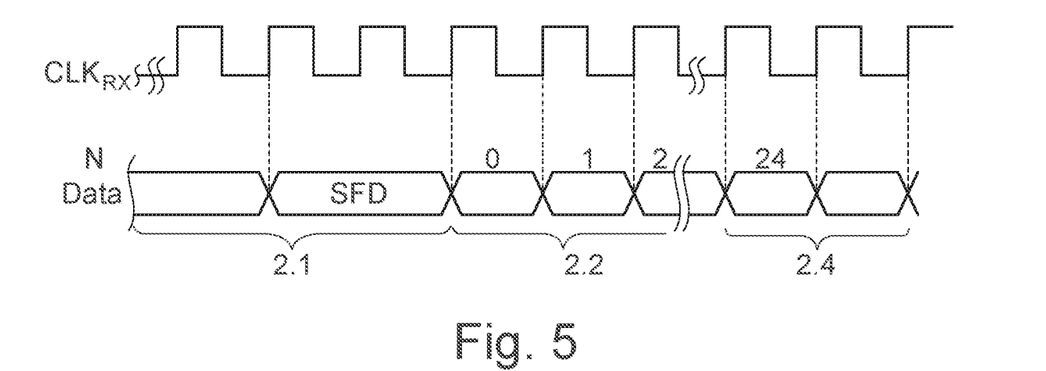
FIG. 5 shows a schematic diagram that illustrates a time segment.

FIG. 4 shows one exemplary embodiment, including an extract of a schematic circuit of a coupler 10. FIG. 4 shows a receiver part 115 (RXPHY) of an interface circuit and a data filter circuit 400, including a counter circuit 409. If the two status signals, $Enable_{RX}$ and $Error_{RX}$, indicate that an Ethernet telegram 2 is received, and no errors are detected during receipt, counter circuit 409 counts incoming nibbles as 4-bit receive data RX in each case with an edge of a clock signal $CLK_{RX}$. Due to the counting, a counter value N is incremented in the exemplary embodiment in FIG. 4. Alternatively, the counter value could also be decremented. FIG. 5 shows a schematic diagram, including signals $CLK_{RX}$, N, Data of an exemplary embodiment. At the end of preamble 2.1, the SFD (Start of Frame Delimiter) is ascertained and the nibbles counted, starting therefrom. At counter value N=24, the data Data of field 2.4 is filtered out. Data Data corresponds to EtherType from N=24 to N27, which is filtered out of control data CD as the predetermined subset.

Figure 6:
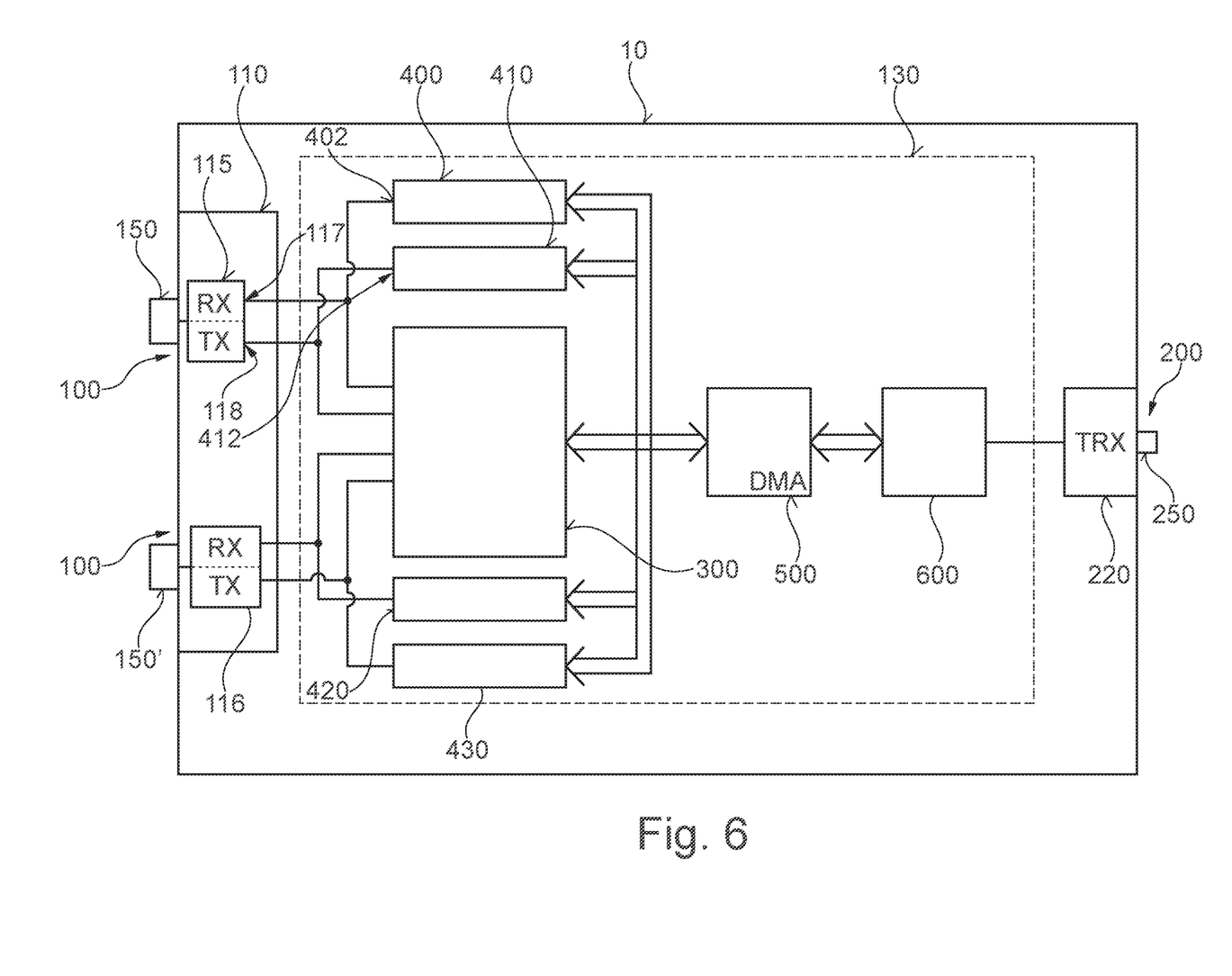
FIG. 6 shows a schematic block diagram of another exemplary embodiment of a coupler.

FIG. 6 shows another exemplary embodiment as a schematic block diagram of a coupler 10. Network interface 100 has two jacks 150, 150'. This makes it possible to design the Ethernet-based network in a ring structure. Interface circuit 110 of network interface 100 includes a first transceiver circuit 115 and a second transceiver circuit 116. An output 117 of first transceiver circuit 115 is connected to an input 402 of a first data filter circuit 400. An input 118 of first transceiver circuit 115 is connected to an input 412 of a second data filter circuit 410. The input and output of second transceiver circuit 116 are connected to a third data filter circuit 420 and a fourth data filter circuit 430, respectively. Due to the circuit of the exemplary embodiment in FIG. 6, an incoming Ethernet telegram may thus be filtered via a connection 150, 150', regardless of connection 150, 150' via which the Ethernet telegram is received. Due to the circuit of the exemplary embodiment in FIG. 6, an outgoing Ethernet telegram may also be filtered via a connection 150, 150', regardless of connection 150, 150' via which the Ethernet telegram is transmitted. The subsets of the control data of incoming and outgoing Ethernet telegrams may be compared with each other hereby. Alternatively to the representation in FIG. 6, in another embodiment only two data filter circuits 400 and 420 may be provided exclusively for receiving the Ethernet telegrams.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A coupler for an automation system for controlling a process, the coupler comprising:
   a network interface for connection to an Ethernet-based network for receiving an Ethernet telegram having process data of the process and having control data;
   a local bus interface for connection to a local bus for transmitting a local bus telegram; and
   a circuit formed between the network interface and the local bus interface,
   wherein the circuit includes an arithmetic circuit for retrieving the process data from a payload data area of the Ethernet telegram,
   wherein the circuit includes a first data filter circuit, which differs from the arithmetic circuit, for filtering out a predetermined subset of the control data from a header of the Ethernet telegram preceding the payload data area, wherein the circuit is configured to generate the local bus telegram and to insert the process data and the predetermined subset of the control data into the local bus telegram, and wherein the local bus telegram is shorter than the Ethernet telegram.

2. The coupler according to claim 1, wherein the first data filter circuit is configured to set the predetermined subset of the control data.

3. The coupler according to claim 2, wherein the first data filter circuit has an input for setting the predetermined subset of the control data or wherein the circuit is configured to set the predetermined subset of the control data via the input of the first data filter circuit.

4. The coupler according to claim 1, wherein the circuit includes a second data filter circuit in addition to the first data filter circuit for filtering out the predetermined subset of the control data.

5. The coupler according to claim 1, wherein the network interface includes a first physical interface, and wherein the first data filter circuit and the second data filter circuit are connected to the same first physical interface of the network interface.

6. The coupler according to claim 1, wherein the first data filter circuit and the second data filter circuit are connected to different physical interfaces of the network interface.

7. The coupler according to claim 1, wherein a data input of the data filter circuit of the circuit is connected to an output of a physical interface, and/or wherein a data input of the data filter circuit of the circuit is connected to an output of a physical interface.

8. The coupler according to claim 1, wherein the first data filter circuit includes a counter, and wherein the first data filter circuit is configured:
to count data units of the Ethernet telegram by incrementing or decrementing a counter value; and
to filter out the predetermined subset of the control data based on the counter value.

9. The coupler according to claim 1, wherein the first data filter circuit is configured to filter out an identifier for a type of the received Ethernet telegram.

10. The coupler according to claim 1, wherein the circuit is configured to process or to compress the predetermined subset of the control data before the control data is inserted, and
wherein the circuit is configured to insert the processed or compressed, predetermined subset of the control data into a payload section of the local bus telegram.

11. An automation system for controlling a process, comprising at least one coupler according to claim 1.

12. A method for operating a coupler for an automation system, the method comprising:
receiving an Ethernet telegram, including process data of the process and including control data, via a network interface for connection to an Ethernet-based network;
transmitting a local bus telegram via a local bus interface for connection to a local bus;
retrieving the process data from a payload data area of the Ethernet telegram using an arithmetic circuit of a circuit of the coupler;
filtering a predetermined subset of the control data from a header of the Ethernet telegram using a first data filter circuit of the circuit of the coupler, which differs from the arithmetic circuit; and
generating a local bus telegram using the circuit of the coupler, the process data and the predetermined subset of the control data being inserted into the local bus telegram,
wherein the local bus telegram is shorter than the Ethernet telegram.

13. The coupler according to claim 1, wherein the arithmetic circuit and the first data filter circuit are configured such that the arithmetic unit retrieves the process data and the first data filter circuit filters out the predetermined subset of the control data simultaneously.

14. The method according to claim 12, wherein the process data are retrieved and the predetermined subset of the control data are filtered simultaneously.

15. The coupler according to claim 1, wherein the local bus telegram comprises:
a header;
a payload data area following the header; and
a trailer following the payload data area, and
wherein the circuit is configured to insert the process data and the predetermined subset of the control data in the payload data area of the local bus telegram.

16. The coupler according to claim 15, wherein the process data precedes the predetermined subset of the control data in the payload data area of the local bus telegram.

17. The coupler according to claim 1,
wherein one or more local bus users are connected to the local bus, and
wherein the first data filter circuit is configured to filter out control data that do not contain process data for the local bus users.

18. The method according to claim 12,
wherein one or more local bus users are connected to the local bus, and
wherein the control data that do not contain process data for the local bus users are filtered out.

* * * * *